United States Patent
Hirsch et al.

(10) Patent No.: US 9,972,895 B2
(45) Date of Patent: May 15, 2018

(54) ANTENNA FOR USE IN A WEARABLE DEVICE

(71) Applicant: BRAGI GmbH, München (DE)

(72) Inventors: Eric Christian Hirsch, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 0 days. days.

(21) Appl. No.: 15/349,975

(22) Filed: Nov. 11, 2016

(65) Prior Publication Data

US 2017/0062913 A1 Mar. 2, 2017

Related U.S. Application Data

(63) Continuation-in-part of application No. 14/941,639, filed on Nov. 15, 2015, now Pat. No. 9,866,282.
(Continued)

(51) Int. Cl.
*H01Q 7/00* (2006.01)
*H01Q 1/24* (2006.01)
(Continued)

(52) U.S. Cl.
CPC ........... *H01Q 1/273* (2013.01); *H01Q 1/2291* (2013.01); *H01Q 1/38* (2013.01); *H01Q 7/08* (2013.01);
(Continued)

(58) Field of Classification Search
CPC . H04R 1/10; H04R 25/00; H01Q 1/22; H01Q 1/2291; H01Q 1/24; H01Q 7/00; H01Q 7/06

See application file for complete search history.

(56) References Cited

U.S. PATENT DOCUMENTS

| 3,934,100 | A | 1/1976 | Harada |
| 4,150,262 | A | 4/1979 | Ono |

(Continued)

FOREIGN PATENT DOCUMENTS

| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).
(Continued)

*Primary Examiner* — Blane Jackson
(74) *Attorney, Agent, or Firm* — Goodhue, Coleman & Owens, P.C.

(57) ABSTRACT

An earpiece includes a housing, a first short range transceiver for far field communication disposed within the housing, and a second short range transceiver for near field communication disposed within the housing. The second short range transceiver for near field communications comprises an antenna formed from a plurality of coil turns. There is a battery disposed within the housing. The earpiece further includes a first generally planar printed circuit board disposed within the housing and a second generally planar printed circuit board disposed within the housing. There is a flexible connector between circuit boards. The battery is positioned between the first generally planar printed circuit board and the second generally planar printed circuit board. The antenna is mounted perpendicularly to the plurality of components mounted on the first generally planar printed circuit board to thereby reduce electromagnetic interference.

13 Claims, 11 Drawing Sheets

Related U.S. Application Data

(60) Provisional application No. 62/254,591, filed on Nov. 12, 2015, provisional application No. 62/211,725, filed on Aug. 29, 2015.

(51) Int. Cl.

| | | |
|---|---|---|
| *H04R 1/10* | (2006.01) | |
| *H01Q 1/27* | (2006.01) | |
| *H01Q 1/22* | (2006.01) | |
| *H04B 5/00* | (2006.01) | |
| *H01Q 7/08* | (2006.01) | |
| *H01Q 1/38* | (2006.01) | |
| *H04B 1/3827* | (2015.01) | |
| *H04W 4/00* | (2018.01) | |

(52) U.S. Cl.
CPC .......... *H04B 1/385* (2013.01); *H04B 5/0031* (2013.01); *H04B 5/0081* (2013.01); *H04W 4/008* (2013.01)

(56) References Cited

U.S. PATENT DOCUMENTS

| | | | |
|---|---|---|---|
| 4,334,315 | A | 6/1982 | Ono et al. |
| 4,375,016 | A | 2/1983 | Harada |
| 4,588,867 | A | 5/1986 | Konomi |
| 4,654,883 | A | 3/1987 | Iwata |
| 4,682,180 | A | 7/1987 | Gans |
| 4,791,673 | A | 12/1988 | Schreiber |
| 4,865,044 | A | 9/1989 | Wallace et al. |
| 5,191,602 | A | 3/1993 | Regen et al. |
| 5,201,007 | A | 4/1993 | Ward et al. |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,363,444 | A | 11/1994 | Norris |
| 5,497,339 | A | 3/1996 | Bernard |
| 5,606,621 | A | 2/1997 | Reiter et al. |
| 5,613,222 | A | 3/1997 | Guenther |
| 5,692,059 | A | 11/1997 | Kruger |
| 5,721,783 | A | 2/1998 | Anderson |
| 5,749,072 | A | 5/1998 | Mazurkiewicz et al. |
| 5,771,438 | A * | 6/1998 | Palermo .................. H02J 7/025 455/41.1 |
| 5,802,167 | A | 9/1998 | Hong |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,542,721 | B2 | 4/2003 | Boesen |
| 6,560,468 | B1 | 5/2003 | Boesen |
| 6,654,721 | B2 | 11/2003 | Handelman |
| 6,664,713 | B2 | 12/2003 | Boesen |
| 6,694,180 | B1 | 2/2004 | Boesen |
| 6,718,043 | B1 | 4/2004 | Boesen |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| 7,463,902 | B2 | 12/2008 | Boesen |
| 7,508,411 | B2 | 3/2009 | Boesen |
| 7,859,469 | B1 * | 12/2010 | Rosener .................. H01Q 1/22 343/702 |
| 7,979,035 | B2 | 7/2011 | Griffin et al. |
| 7,983,628 | B2 | 7/2011 | Boesen |
| 8,095,188 | B2 | 1/2012 | Shi |
| 8,140,357 | B1 | 3/2012 | Boesen |
| 8,300,864 | B2 | 10/2012 | Johansen |
| 8,436,780 | B2 | 5/2013 | Schantz et al. |
| 8,719,877 | B2 | 5/2014 | VonDoenhoff et al. |
| 9,729,979 | B2 * | 8/2017 | Ozden .................. H04R 25/554 |
| 9,848,257 | B2 * | 12/2017 | Ambrose ............. H04R 1/1016 |
| 2001/0005197 | A1 | 6/2001 | Mishra et al. |
| 2001/0027121 | A1 | 10/2001 | Boesen |
| 2001/0056350 | A1 | 12/2001 | Calderone et al. |
| 2002/0002413 | A1 | 1/2002 | Tokue |
| 2002/0007510 | A1 | 1/2002 | Mann |
| 2002/0010590 | A1 | 1/2002 | Lee |
| 2002/0030637 | A1 | 3/2002 | Mann |
| 2002/0046035 | A1 | 4/2002 | Kitahara et al. |
| 2002/0057810 | A1 | 5/2002 | Boesen |
| 2002/0076073 | A1 | 6/2002 | Taenzer et al. |
| 2002/0118852 | A1 | 8/2002 | Boesen |
| 2003/0065504 | A1 | 4/2003 | Kraemer et al. |
| 2003/0100331 | A1 | 5/2003 | Dress et al. |
| 2003/0104806 | A1 | 6/2003 | Ruef et al. |
| 2003/0115068 | A1 | 6/2003 | Boesen |
| 2003/0125096 | A1 | 7/2003 | Boesen |
| 2003/0218064 | A1 | 11/2003 | Conner et al. |
| 2004/0070564 | A1 | 4/2004 | Dawson et al. |
| 2004/0160511 | A1 | 8/2004 | Boesen |
| 2005/0043056 | A1 | 2/2005 | Boesen |
| 2005/0125320 | A1 | 6/2005 | Boesen |
| 2005/0148883 | A1 | 7/2005 | Boesen |
| 2005/0165663 | A1 | 7/2005 | Razumov |
| 2005/0196009 | A1 | 9/2005 | Boesen |
| 2005/0251455 | A1 | 11/2005 | Boesen |
| 2005/0266876 | A1 | 12/2005 | Boesen |
| 2006/0029246 | A1 | 2/2006 | Boesen |
| 2006/0074671 | A1 | 4/2006 | Farmaner et al. |
| 2006/0074808 | A1 | 4/2006 | Boesen |
| 2008/0254780 | A1 | 10/2008 | Kuhl et al. |
| 2009/0073070 | A1 | 3/2009 | Rofougaran |
| 2010/0203831 | A1 | 8/2010 | Muth |
| 2014/0321682 | A1 * | 10/2014 | Kofod-Hansen .... H04R 25/305 381/315 |
| 2017/0263376 | A1 * | 9/2017 | Verschueren ........... H01F 38/14 |

FOREIGN PATENT DOCUMENTS

| | | |
|---|---|---|
| JP | 36292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is on Facebook (2014).
BRAGI Update—Arrival of Prototype Chassis Parts—More People—Awesomeness (May 13, 2014).

(56) References Cited

OTHER PUBLICATIONS

BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update-Alpha 5 and Back to China, Backer Day, on Track(May 16, 2015).
BRAGI Update-Beta2 Production and Factory Line(Aug. 20, 2015).
BRAGI Update-Certifications, Production, Ramping Up (Nov. 13, 2015).
BRAGI Update-Developer Units Shipping and Status(Oct. 5, 2015).
BRAGI Update-Developer Units Started Shipping and Status (Oct. 19, 2015).
BRAGI Update-Developer Units, Investment, Story and Status(Nov. 2, 2015).
BRAGI Update-Getting Close(Aug. 6, 2014).
BRAGI Update-On Track, Design Verification, How It Works and What's Next(Jul. 15, 2015).
BRAGI Update-On Track, on Track and Gems Overview (Jun. 24, 2015.
BRAGI Update-Status on Wireless, Supply, Timeline and Open House@BRAGI(Apr. 1, 2015).
BRAGI Update-Unpacking Video, Reviews on Audio Perform and Boy Are We Getting Close(Sep. 10, 2015).
Last Push Before The Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash-A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP2016/07216 (dated Oct. 18, 2016).

\* cited by examiner

… (1) …

ANTENNA FOR USE IN A WEARABLE DEVICE

PRIORITY STATEMENT

This application is a continuation-in-part application and claims priority to U.S. patent application Ser. No. 14/941,639, filed Nov. 15, 2016 which claims priority to U.S. Provisional Patent Application No. 62/211,725, filed Aug. 29, 2015, both of which are hereby incorporated by reference in its entirety.

This application also claims priority to U.S. Provisional Patent Application No. 62/254,591, filed Nov. 12, 2015, hereby incorporated by reference in its entirety.

FIELD OF THE INVENTION

The present invention relates to antenna. More particularly, but not exclusively, the present invention relates to an antenna for use in a wearable device such as an ear piece.

BACKGROUND OF THE ART

Various types of wireless communication linkages exist. However, there can be numerous issues when used in particular environments and/or applications. For example, in the case of wearable devices where a left earpiece is to communicate with a right earpiece there may be issues using Bluetooth wireless transceivers due to a combination of factors involving attenuation, reliability in varied environments and sensitivity. An alternative approach is to use near field magnetic induction (NFMI). NFMI is unaffected by body tissues and demonstrates improved sensitivity. However, use of NFMI introduces additional problems. For example, the placement of the antenna may be problematic. Magnetic fields induced by the PCB limits the areas of the wearable device capable of providing optimal electromagnetic field generation. In addition, there are concerns regarding the possibility of additional interference generated from other related electronic components.

SUMMARY OF THE INVENTION

Therefore it is a primary object, feature, or advantage of the present invention to improve over the state of the art.

It is a further object, feature, or advantage of the present invention to provide for an improved wearable device.

It is a still further object, feature, or advantage of the present invention to provide an antenna for NFMI suitable for use in a wearable device to allow for communication with other wearable devices.

Another object, feature, or advantage of the present invention is to provide an antenna for induction which avoids magnetic fields induced by the printed circuit board and other electronic components associated with a wearable device.

Yet another object, feature, or advantage of the present invention is to provide for improved placement of an antenna within a wearable device for improved orientation of the electromagnetic field.

A further object, feature, or advantage of the present invention is to provide for an antenna that is sufficiently powerful for expected tasks and is straightforward in its manufacturing and assembly.

A still further object, feature or advantage of the present invention is position an antenna relative to a Bluetooth antenna to facilitate enhancement of Bluetooth reception by the Bluetooth antenna.

Another object, feature, or advantage of the present invention is to position an antenna in the posterior superior segment of a wearable to allow for reliable bilateral transmission of audio and data to another wearable device.

Yet another object, feature, or advantage of the present invention is to provide a common ground plane between two wearable devices to allow for expansion of the electromagnetic field.

A further object, feature, or advantage of the present invention is to provide for antenna contact with the skin of a user wearing the wearable device in order to extend the electromagnetic field.

A still further object, feature, or advantage of the present invention is to allow for coils to be positioned in various places.

Another object, feature, or advantage of the present invention is to orient an antenna perpendicular to other electronic components to minimize electromagnetic interference with the other components.

Yet another object, feature, or advantage of the present invention is to orient an antenna at the perimeter of a PCB in order to limit the electromagnetic field interference.

One of these and/or other objects, features, or advantages of the present invention will become apparent from the specification and claims that follow. It is to be understood that different embodiments are disclosed herein and that no embodiment need meet each and every object, feature, or advantage as set forth herein. Different embodiments may have different objects, features, or advantages.

According to one aspect an earpiece is provided. The earpiece includes a housing, a first short range transceiver for far field communication disposed within the housing, and a second short range transceiver for near field communication disposed within the housing. The second short range transceiver for near field communications comprises an antenna formed from a plurality of coil turns. There is a battery disposed within the housing. The earpiece further includes a first generally planar printed circuit board disposed within the housing and having a first plurality of components mounted thereto and a second generally planar printed circuit board disposed within the housing and having a second plurality of components mounted thereto. There is a flexible connector between the first generally planar circuit board and the second generally planar circuit board for providing electrical connections therebetween. The battery is positioned between the first generally planar printed circuit board and the second generally planar printed circuit board. The antenna is mounted perpendicularly to the plurality of components mounted on the first generally planar printed circuit board to thereby reduce electromagnetic interference. The antenna may be mounted at a posterosuperior portion of the earpiece device. The antenna may be mounted between the first generally planar printed circuit board and the second generally planar printed circuit board along an edge of the battery. The plurality of coil turns may be wrapped around a ferrite material such a structure formed from a sheet of ferrite material. The coil turns may be wrapped around the battery or wrapped around a spacer which is positioned around the battery. The ear piece may include a balanced armature speaker and the coil turns may be wrapped around the balanced armature speaker. The coil turns may instead be wrapped around a portion of the housing such as a tip portion of the housing. The first short range transceiver may be a Bluetooth transceiver and the second short range transceiver may be a near field magnetic induction (NFMI) transceiver. The earpiece may further include a memory for storing audio files, the memory disposed within the housing and the audio files may be played back through the earpieces.

DETAILED DESCRIPTION

The present invention relates to a wearable device such as an earpiece having an antenna. Although generally described herein with respect to a near field magnetic induction (NFMI) antenna for use in an ear piece within a set of ear pieces, it is to be understood that the present invention is not limited to that specific application and may be used as an antenna for induction in other types of devices including other types of wearable devices.

Figure 1:
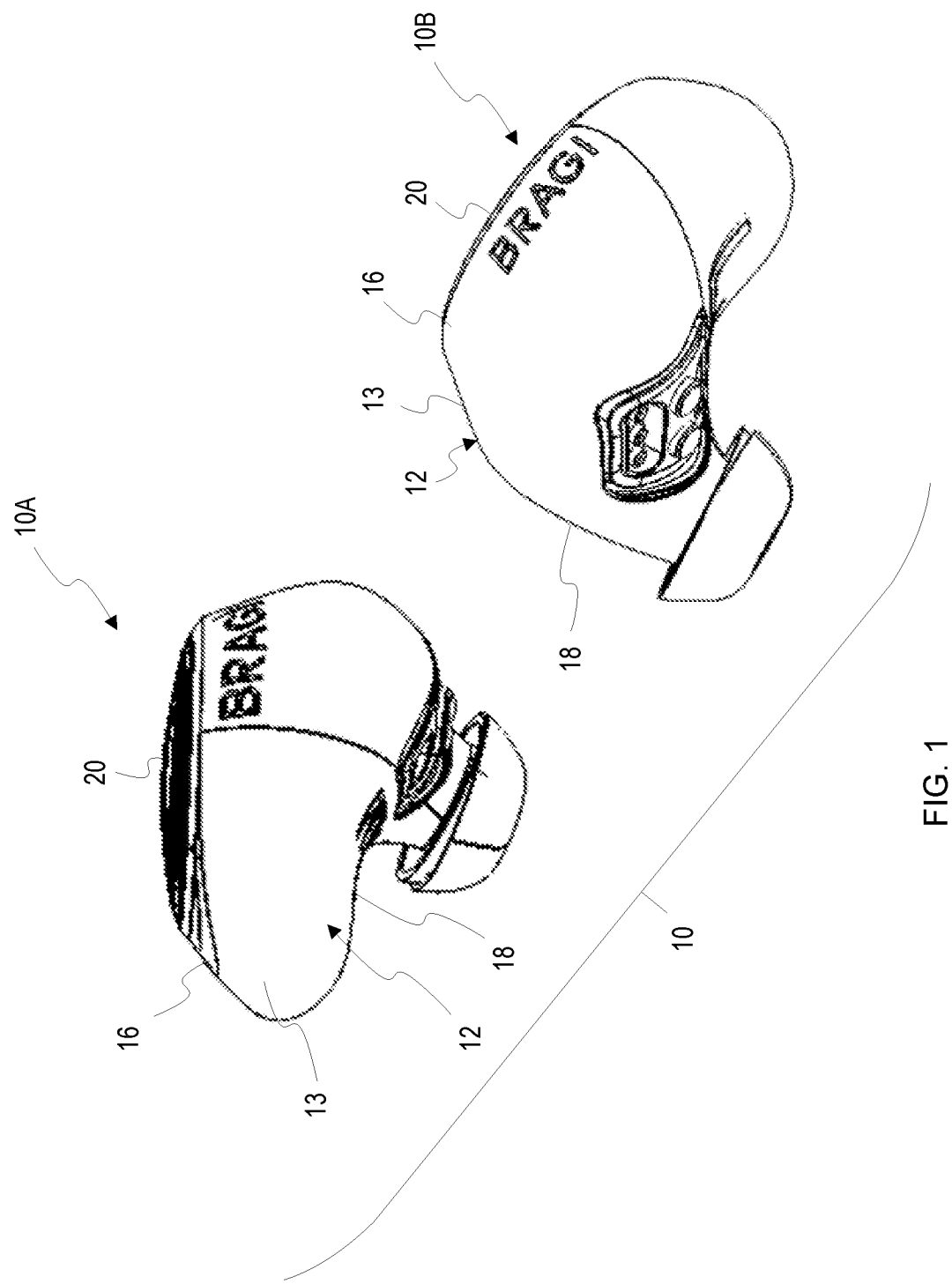
FIG. 1 illustrates one example of a system including two wearable devices in the form of left and right ear pieces which bi-directionally communicate with each other.
Figure 2:
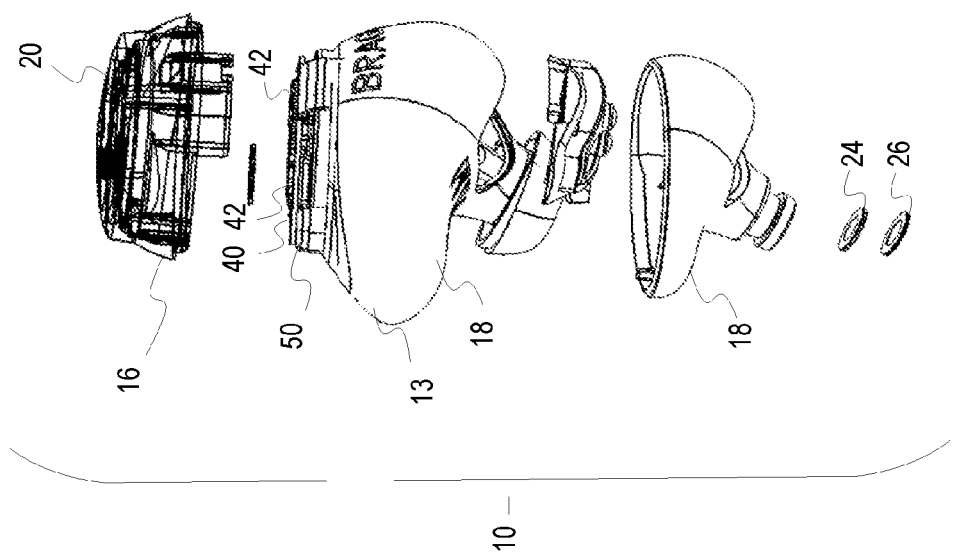
FIG. 2 is an exploded view of a wearable device.

FIG. 1 illustrates one example of a system 10 which includes a first wearable device 10A in the form of an ear piece and a second wearable device 10B also in the form of an ear piece, each having an ear piece housing 12 with a central portion 13 with an upper portion 16 and a lower portion 18. A light guide assembly 20 is shown operatively connected to the housing to provide for selective illumination to provide feedback to a user. FIG. 2 provides an exploded view of the wearable device 10A. A waterproof pad 24 and protection mesh 26 are shown. In addition in the central or main portion 13 of the wearable device 10A a first printed circuit board 40 is shown with a plurality of electronic components 42 mounted thereto. The plurality of electronic components 42 may include a memory circuit such as for storing audio files which may be played back by the earpiece or a set of ear pieces. The plurality of electronic components 42 may also include a short range transceiver configured for far field communications such as a wireless radio such as a Bluetooth transceiver, Bluetooth Low Energy (BLE), an ultra-wideband (UWB), or other type of transceiver. A transceiver such as a near field magnetic induction (NFMI) transceiver may be mounted at an edge or perimeter of the printed circuit board 40. The transceiver 50 may be mounted at a posterosuperior portion of the wearable device 10A.

The system 10 allows for near field communication of audio channels between the left and right-sided wearable devices 10A, 10B. Other types of data may also be communicated between the left and right-sided wearable devices 10A, 10B if desired including sensor information or other data.

Figure 3:
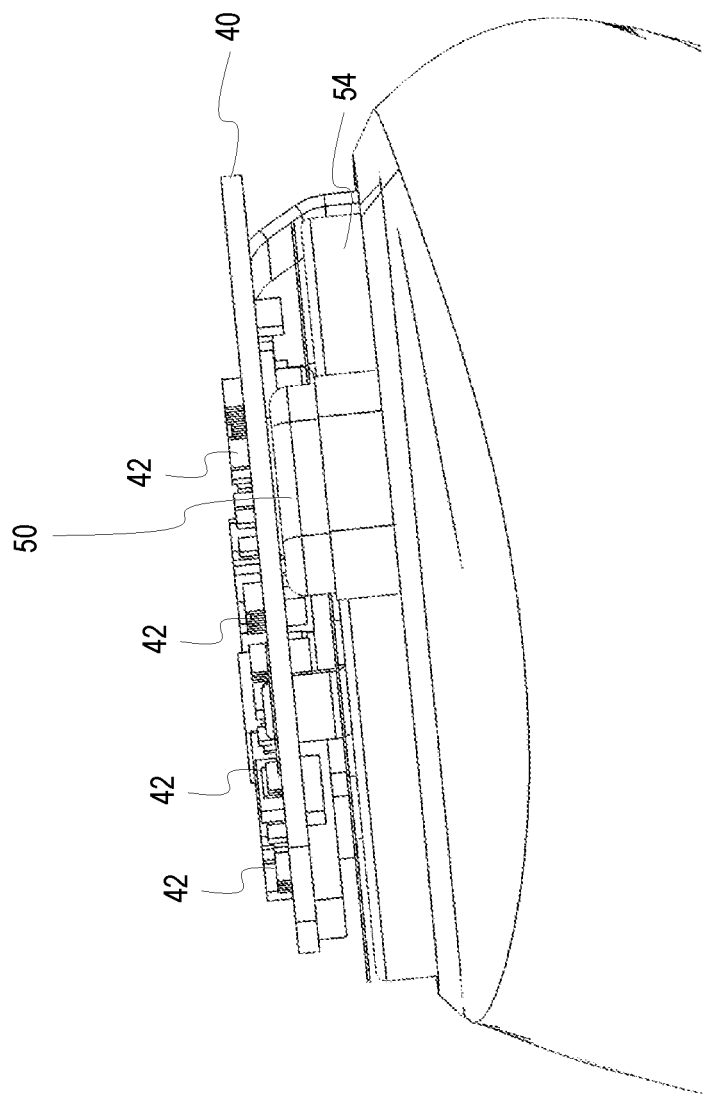
FIG. 3 illustrates a printed circuit board of the wearable device positioned relative to an induction circuit/antenna.

FIG. 3 illustrates another view of the first printed circuit board 40 with electronic components 42. A transceiver 50 is shown mounted at an edge or perimeter of the printed circuit board 40. The printed circuit board is generally planar. Note that the transceiver 50 is mounted perpendicularly or orthogonally to the top surface of the printed circuit board 40 and the plurality of components 42 mounted thereto. Positioning the transceiver 50 in this relationship provides for reducing electromagnetic interference. The transceiver 50 may be formed of a plurality of coils wrapped around a ferrite material. For example, the ferrite material may be a ferrite sheet formed into the structure shown. As shown in FIG. 3, the transceiver 50 may be positioned along an outside of a battery 54.

Figure 4:
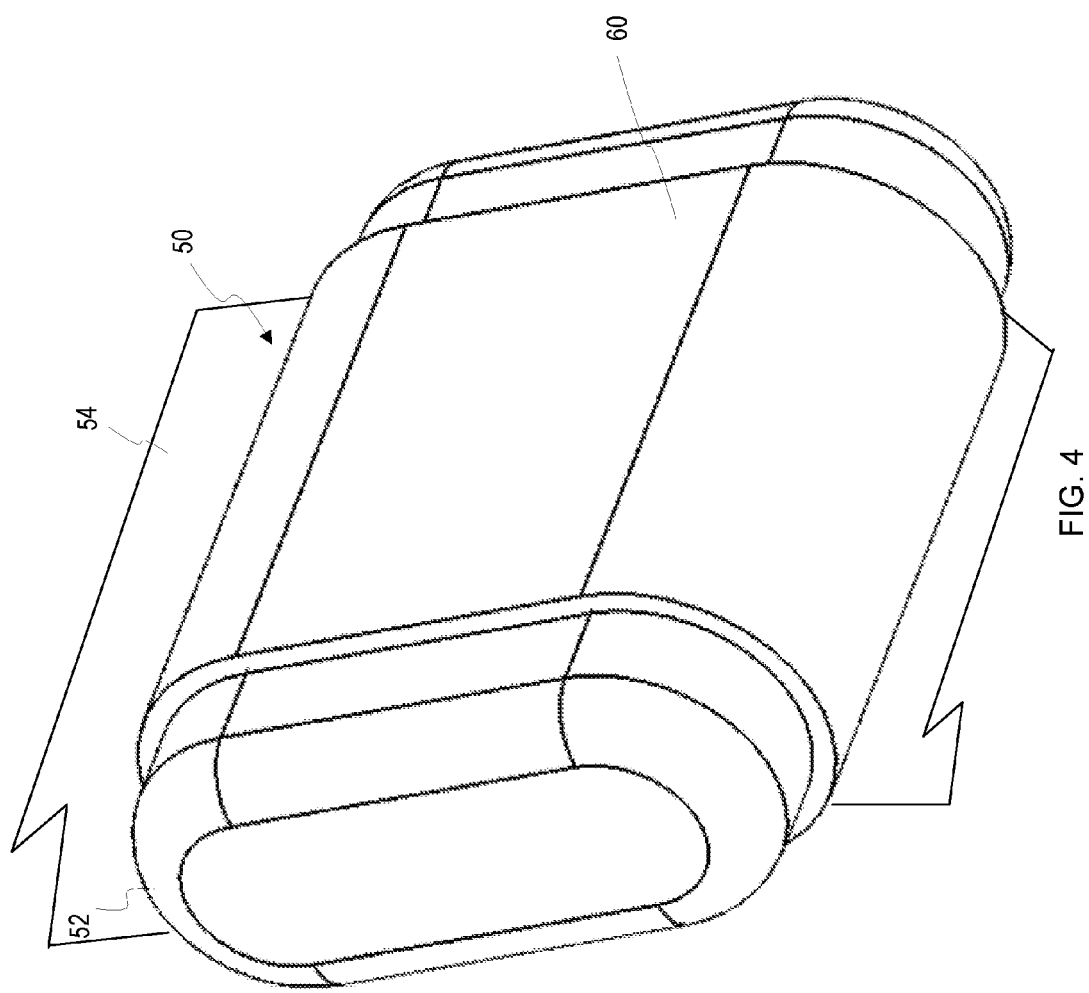
FIG. 4 illustrates a core.
Figure 5:
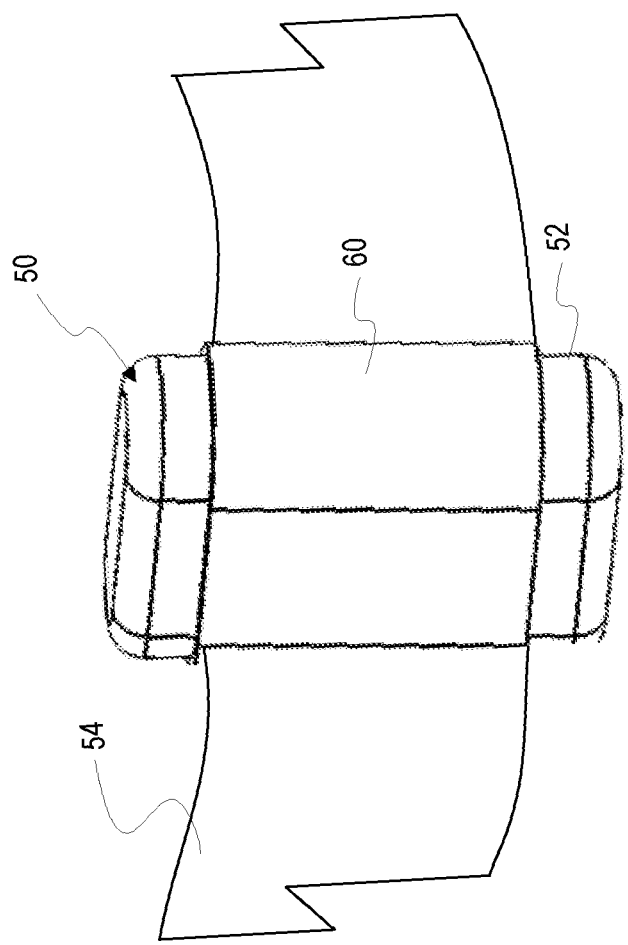
FIG. 5 illustrates a core with coil turns thereon.

As shown in FIG. 4, the transceiver 50 has a plurality of coil turns 60 wrapped around the ferrite material 52. As shown in FIG. 4, the coil turns 60 may be tightly wrapped with respect to one another and thus separation between individual coil turns is not shown. The transceiver 50 may be positioned adjacent to the battery 54. As shown in FIG. 5, a plurality of coil turns 60 may be wrapped around the ferrite material 52. The transceiver 50 is positioned adjacent a battery 54.

In one embodiment NFMI may be used for the communication and audio channels between the left and right sided wearable devices. Placement of the coil at the perimeter of the wearable improves the electromagnetic field, avoiding degradation from adjacent onboard electronics. This allowed for optimal placement of the magnetic field for transmission and reception between the left and right wearable. The preferred embodiment allows for precise positioning within the device for optimal orientation for the electromagnetic field. Further, the preferred embodiment also allows for an NFMI antenna that is sufficiently powerful for the expected tasks, is straightforward in its manufacturing and assembly.

Figure 6:
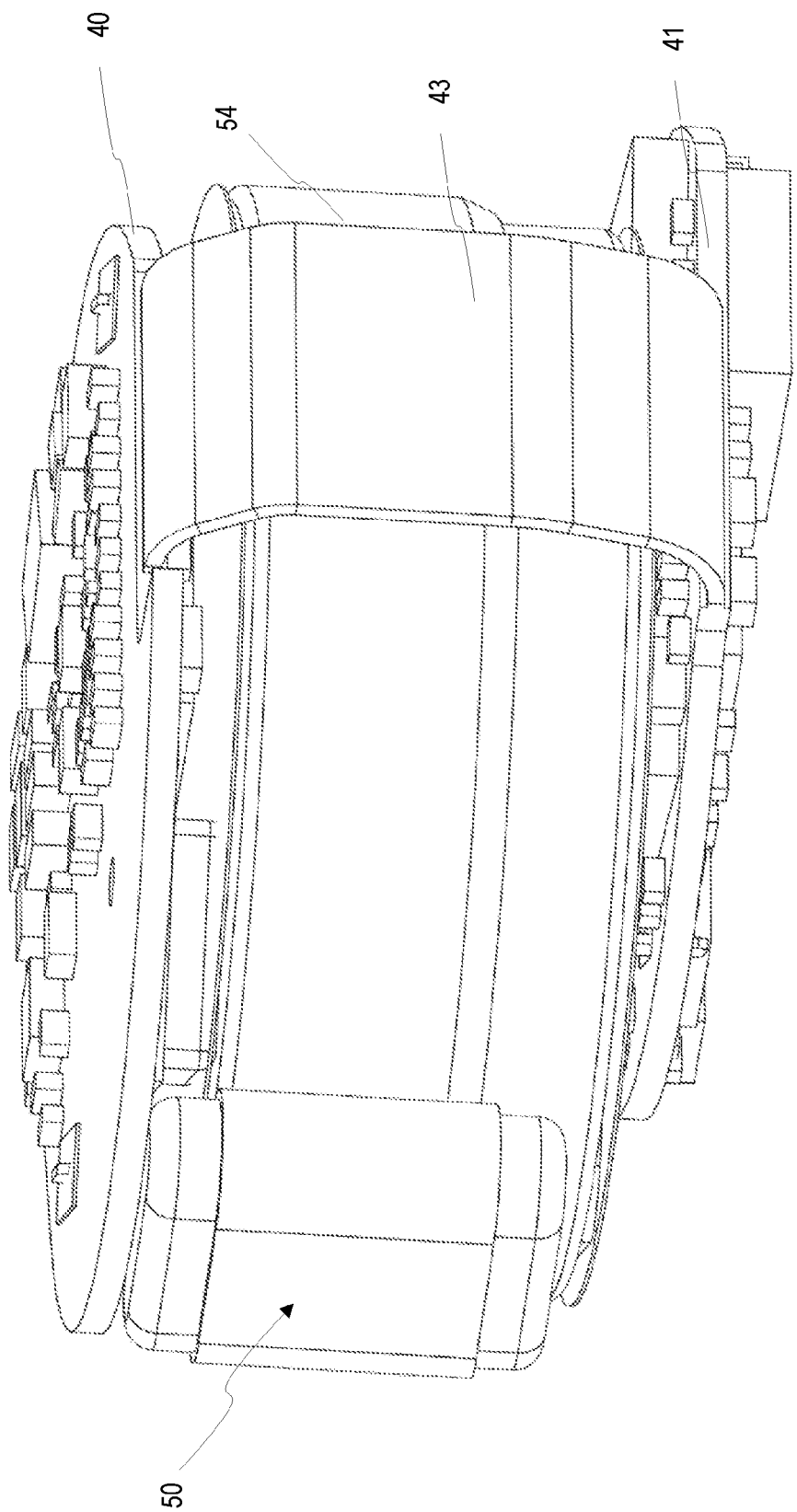
FIG. 6 illustrates printed circuit boards on opposite sides of a battery with an antenna wrapped around the battery.

FIG. 6 illustrates printed circuit boards on opposite sides of a battery with an antenna positioned around the battery. A first printed circuit board 40 is shown as well as a second printed circuit board 41. There is a flexible connector 43 between the first printed circuit board 40 and the second printed circuit board 41 to provide electrical connections therebetween. The transceiver 50 is positioned at an outer portion of the battery and may be positioned adjacent or near to a radio transceiver on the printed circuit board 40.

Figure 7:
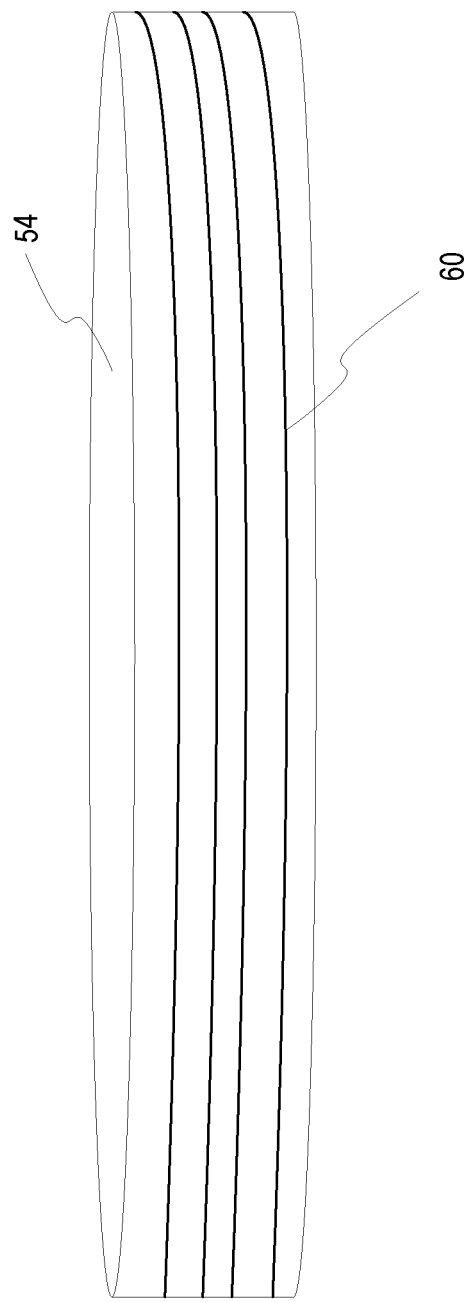
FIG. 7 illustrates another example of a battery with antenna coils wrapped around the battery.

FIG. 7 illustrates another example of a battery 54 with antenna coils 60 wrapped around the battery 54. In this embodiment, the battery such as the one shown in FIG. 6 is positioned between circuit boards and may be wrapped such as in a ferrite tape, but the ferrite tape need not be present. Alternatively, for example, a spacer may be used between the battery and the antenna coils with the coils wrapped around the spacer positioned around the battery. Thus, instead of the transceiver being placed next to the battery, the transceiver is formed by wrapping the coils 60 around the battery 54.

Figure 8:
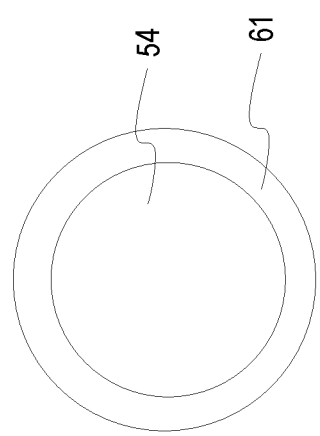
FIG. 8 and FIG. 9 illustrates an example of a spacer positioned around a battery with antenna coils wrapped around the space.
Figure 9:
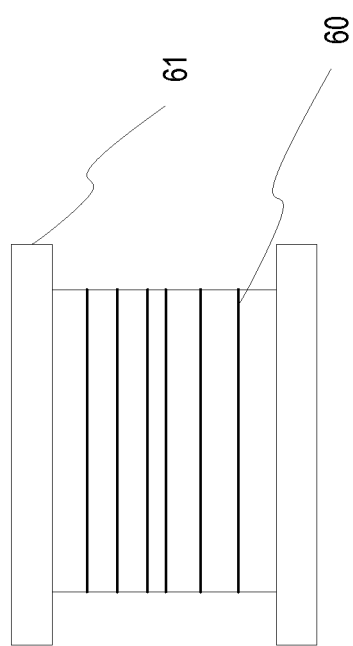

FIG. 8 illustrates an example of a top view of spacer 61 positioned around a battery 54. FIG. 9 illustrates the spacer 61 with antenna coils 60 wrapped around it (and thus around the battery about which the spacer 61 is positioned. Thus, instead of directly wrapping antenna coils 60 around a battery 54, antenna coils 60 may be wrapped around a spacer 61 which in turn is positioned around a battery 54.

Figure 10:
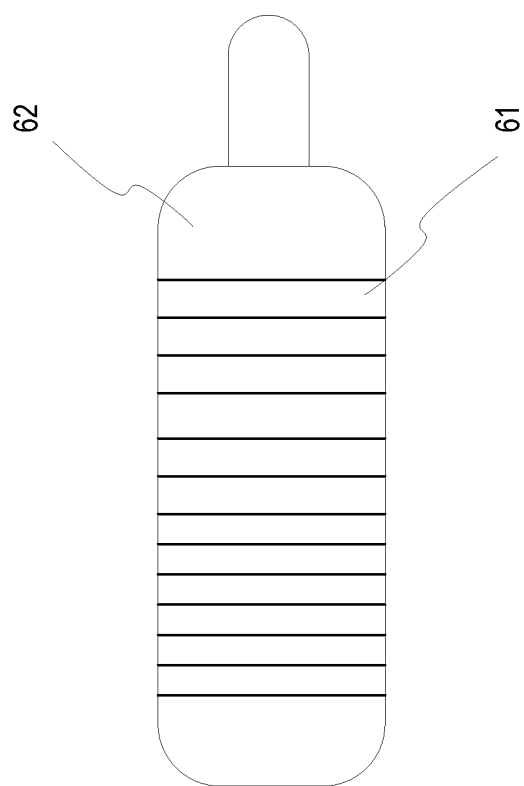
FIG. 10 illustrates a balanced armature speaker with antenna coils wrapped around the balanced armature speaker.

FIG. 10 illustrates a balanced armature speaker 62 with antenna coils 61 wrapped around the balanced armature speaker 62. The armature speaker 62 may be positioned within the earpiece housing and this provides an alternative location for placement of the transceiver formed using the antenna coils 61.

Figure 11:
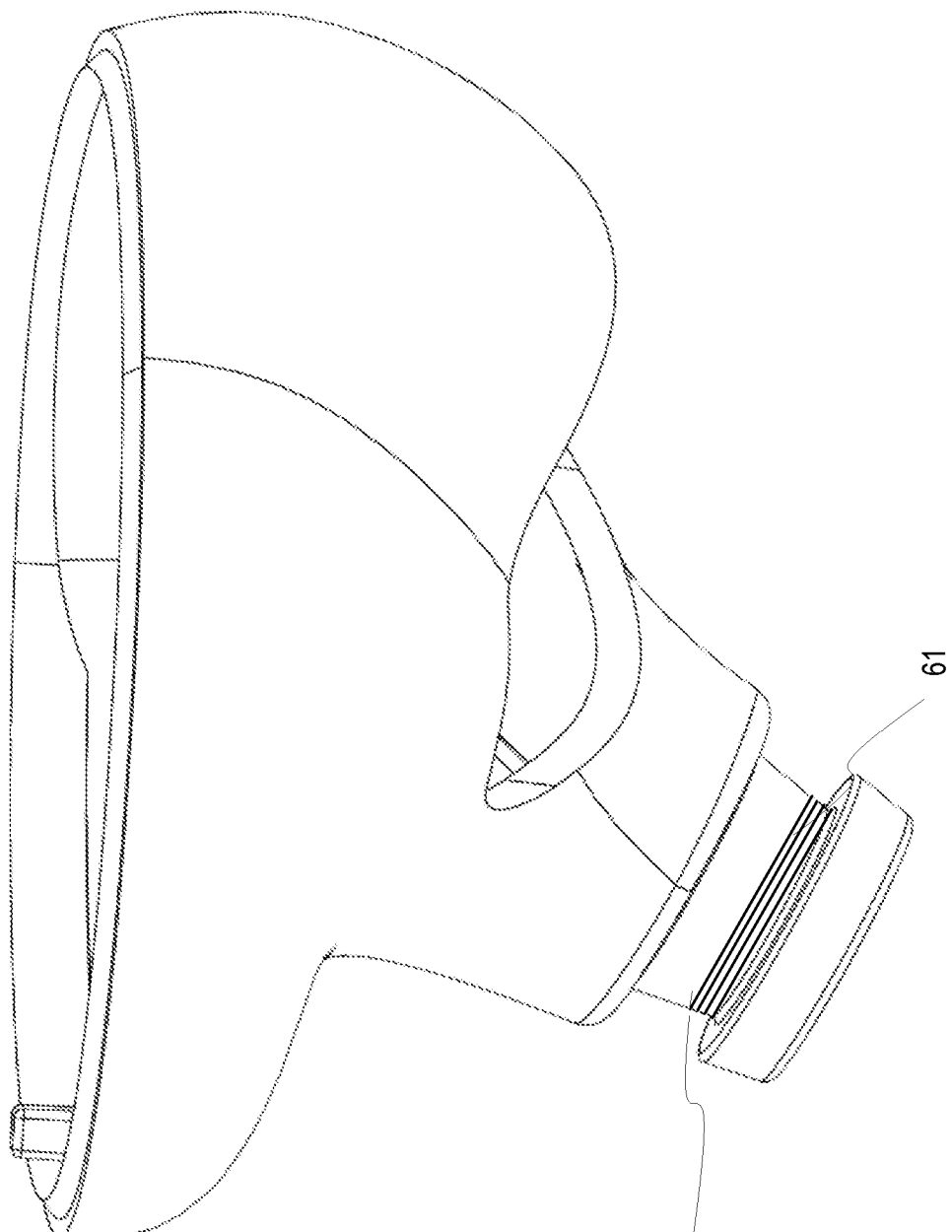
FIG. 11 illustrates a portion of an earpiece housing with antenna coils wrapped around tips of the ear piece housing.

FIG. 11 illustrates a portion of an earpiece housing with antenna coils 61 wrapped around a tip 64 of the ear piece housing.

In addition, the antenna coils may be positioned in other locations in the earpiece including around the earpiece housing or case or portions thereof. The various locations of the earpiece may wrapped in a ferrite tape prior to wrapping the antenna coils around the location. Generally, the location should allow for a coil with circular or substantially circular cross-section to be performed.

Testing was performed on various different locations for the coils to determine range where there was 100 percent and range where there was 0 percent reception. Testing was performed both in open air between two different NFMI transceivers as well as in active wireless earpieces. In addition, testing was performed under varying conditions such as mode of operation of the device (e.g. playing music) at different power settings. The earpiece may include as a part of the circuitry on one of the printed circuit boards a memory for storing music files which may be played back. It is noted that this circuitry as well as processing circuitry and other circuitry may be the source of interference to near field communications. The results of the testing indicate that the antenna may be placed at these various locations throughout the earpiece although different locations as well as other factors may result in different reliable ranges.

Therefore, a wearable device has been shown and described and a system including multiple ear pieces which communicate with one another has also been shown and described. It is to be understood that the present invention contemplates numerous variations, options, and alternatives. The present invention is not to be limited to the specific embodiments and examples set forth herein.

What is claimed is:

1. An earpiece, comprising:
   a housing;
   a first short range transceiver for far field communication disposed within the housing;
   a second short range transceiver for near field communication disposed within the housing;
   wherein the second short range transceiver for near field communications comprises an antenna formed from a plurality of coil turns;
   a battery disposed within the housing;
   a first generally planar printed circuit board disposed within the housing and having a first plurality of components mounted thereto;
   a second generally planar printed circuit board disposed within the housing and having a second plurality of components mounted thereto;
   a flexible connector between the first generally planar circuit board and the second generally planar circuit board for providing electrical connections therebetween;
   wherein the battery is positioned between the first generally planar printed circuit board and the second generally planar printed circuit board;
   wherein the antenna is mounted perpendicularly to the plurality of components mounted on the first generally planar printed circuit board to thereby reduce electromagnetic interference.

2. The earpiece of claim 1 wherein the antenna is mounted at a posterosuperior portion of the earpiece device.

3. The earpiece of claim 1 wherein the antenna is mounted between the first generally planar printed circuit board and the second generally planar printed circuit board along an edge of the battery.

4. The earpiece of claim 1 wherein the plurality of coil turns are wrapped around a ferrite material.

5. The earpiece of claim 4 wherein the ferrite material comprises a sheet of ferrite material.

6. The earpiece of claim 1 wherein the plurality of coil turns are wrapped around the battery.

7. The earpiece of claim 1 wherein the plurality of coil turns are wrapped around a spacer which is wrapped around the battery.

8. The earpiece of claim 1 further comprising a balanced armature speaker and wherein the plurality of coil turns are wrapped around the balanced armature speaker.

9. The earpiece of claim 1 wherein the plurality of coil turns are wrapped around a portion of the housing.

10. The earpiece of claim 9 wherein the housing includes a tip portion and wherein the plurality of coil turns are wrapped around the tip portion of the housing.

11. The earpiece of claim 1 wherein the first short range transceiver is a Bluetooth transceiver.

12. The earpiece of claim 1 wherein the second short range transceiver is a near field magnetic induction (NFMI) transceiver.

13. The earpiece of claim 1 wherein the earpiece is a right earpiece.

* * * * *